Dec. 29, 1953   E. EGER   2,664,133
ANTISKID CHAIN ATTACHMENT
Filed May 21, 1949

INVENTOR
ERNST EGER
BY
Charles C. Willson
ATTORNEY

Patented Dec. 29, 1953

2,664,133

UNITED STATES PATENT OFFICE 2,664,133

ANTISKID CHAIN ATTACHMENT

Ernst Eger, Los Angeles, Calif., assignor to United States Rubber Company, New York, N. Y., a corporation of New Jersey Application May 21, 1949, Serial No. 94,653

2 Claims. (Cl. 152—236)

This invention relates to an anti-skid device for pneumatic tires and, in particular, it relates to an anti-skid member for the tire and anchoring means comprising a clip adapted to engage the tire rim flange and hold the anti-skid member in place upon the tire.

The attachment of anti-skid chains or anti-skid straps to pneumatic tires is usually a difficult and awkward task. In many cases as in solid disk wheels, it is not possible to attach a single anti-skid strap to a tire because of the lack of an attaching device. In such case, it is necessary to use a plurality of links joined together so as to extend circumferentially around the tire.

In accordance with the practice of my invention, I provide a fastening device which may be associated with the rim of a tire and which forms an individual clip having an appropriate opening to permit the attachment of an anti-skid strap. The fastening device which I propose comprises essentially a metallic clip substantially S-shaped in cross section. The length of the clip is merely sufficient to accommodate an opening that receives the attaching means for the anti-skid strap. The fastening device or clip is shaped so as to conform to the contour of both faces of a rim flange with which the device is associated. The peculiar characteristic of the shape of the fastening device is that when the tire is not inflated it will slide readily over the flange of a rim into place, and becomes locked in that position when an anti-skid strap is tightly attached thereto. The fastening device or clip lies, in particular, between the bead of a pneumatic tire and the rim flange. Therefore, when a tire is inflated, the inflation pressure acts to hold the fastening device in place upon the rim flange and to prevent its displacement principally when no anti-skid strap is attached thereto.

Among the objects and advantages of my invention are to provide an anti-skid strap fastening device or clip for association with a tire rim so that the device becomes locked on the rim when a strap is attached thereto; to provide such a device which may be easily and quickly attached to a rim; to provide such a device which is not permanently attached to the rim and which may be applied without the use of any tools; to provide such a device which is sufficiently compact so as to avoid any interference on the tire or rim when the device is in operative use; to provide such a device which when in place but not attached to an anti-skid strap is held in place by the pressure of a tire bead directed against the rim flange; and to provide such a device which may be economically manufactured.

These and other objects and advantages will appear more fully in the following detailed description when considered in connection with the accompanying drawing in which.

Figure 1:
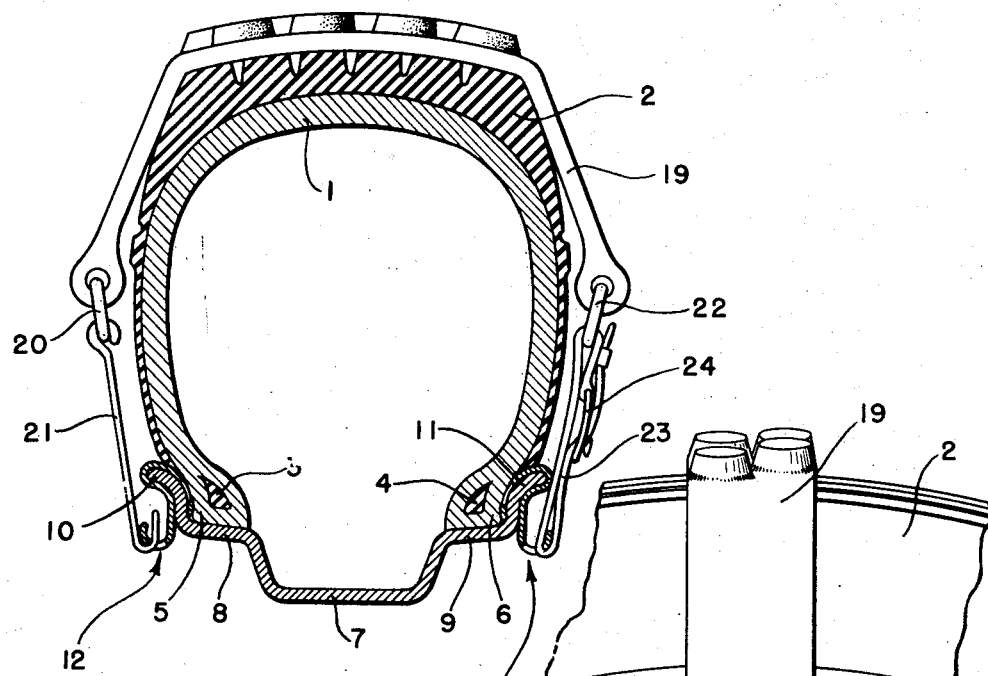
Figure 1 is a transverse view, in section, of an assembly of tire, rim and anti-skid strap in combination with the attaching device of my invention.

With reference to the drawing and, in particular to Figure 1, I show a pneumatic tire comprising a carcass 1 of strain resisting elements, a tread 2 of rubber composition and substantially inextensible beads 3 and 4. The tire also includes bead portions 5 and 6 forming that part of the carcass 1 which is supported by a rim.

The tire is shown in assembly position with a conventional rim 7 which is of the drop center type. The rim 7 includes bead seats 8 and 9 and rim flanges 10 and 11 that have outwardly extending lips. It is to be understood that a conventional inner tube, not shown, may be used in combination with the tire and rim.

The fastening device according to my invention comprises a metallic clip 12 about two inches in length and substantially S-shaped in cross section to its length. This length, however, may be from one to three inches. The clip is preferably made of steel and of a thickness of approximately $\frac{1}{16}$ inch. The clip 12 includes a portion 13 which is provided with a radial curve in order to accommodate or follow the curved surface of the inner portions of the flanges 10 and 11. Also, the length of the radial portion 13 is substantially equal to the height of the flange 10 or 11. Directly opposite the radial portion 13 and connected thereto by a curved wall is a return portion 14 parallel to the radial portion 13 and spaced therefrom a distance substantially equal to the thickness of the rim flange 10 or 11. This space between the portions 13 and 14 is approximately $\frac{1}{16}$ inch. Forming a continuation of the curved portion 14 is a downwardly extending portion 15. This portion 15 is provided with an elongated aperture 16 which is adapted to receive attaching means for the anti-skid strap. The radial portion 13 is also provided with an elongated slot 17. The purpose of this slot is to provide an opening into which a portion of the beads 5 and 6 may be pressed due to inflation pressure within the tire so as to prevent displacement of the clip 12 after it is assembled with the rim. The longitudinal surface such as 18 of the clip 12 is curved in conformity with the circumferentially curvature of the surfaces of the rim flanges 10 and 11. By curving the clip 12 in this manner it fits snugly upon the rim flange.

Figure 2:
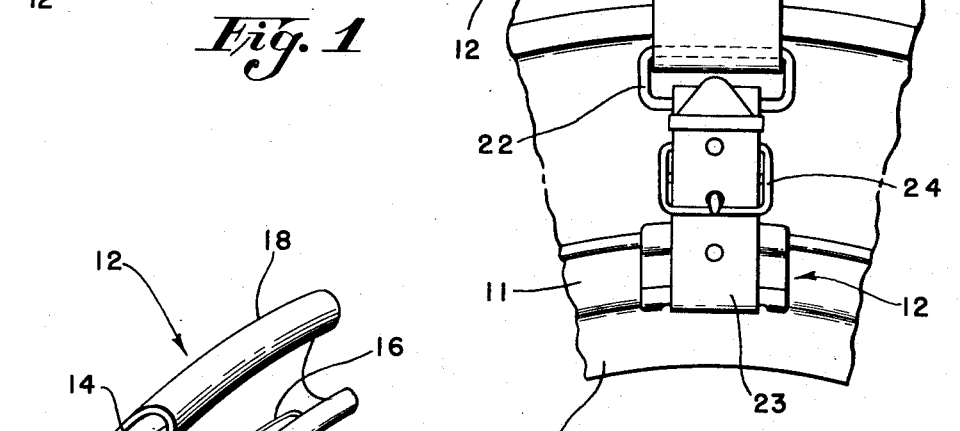
Figure 2 is a portion of a side elevational view thereof.
Figure 3:
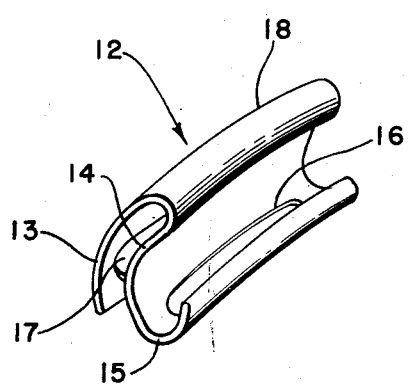
Figure 3 is a perspective view of the fastening device forming an embodiment of my invention.

As shown in Figs. 1 and 2, a conventional anti-skid strap 19 is associated with the tire assembly. This anti-skid member 19 may be formed of rubber and fabric composition or it may be in the form of conventional chain links. At one end of the strap 19 is a link 20 to which a hook 21 is attached. The hook 21 engages the portion of the clip 12 provided with the slot 16. At the opposite side of the tire a link 22 engages the anti-skid member 19 and receives a strap 23 having a buckle 24. The strap 23 is attached to a clip 12 and extends through the elongated slot 16.

In the assembly of the fastening device of my invention, the tire is deflated and one or more pair of clips are slipped over the rim flange so that the clips are directly opposite one another cross sectionally of the tire. It is to be understood that a single set of clips may be used or that several sets may be used depending on the number of anti-skid straps desired. Preferably, however, the clips should be applied in such a manner and in such number as to maintain the proper balance of the rotating tire. When the clips are in proper position, the tire is inflated and the bead portions 5 and 6 become pressed firmly against the clips 12. This prevents the clips from becoming displaced relative to their original predetermined position. When it is desired to mount an anti-skid device such as a strap or chain on the tire, it is merely necessary to slip the hook 21 into engagement with the slot 16 of the clip 12 at one face of the tire. The opposite side of the anti-skid member is secured to the clip 12 by means of the strap 23. By this arrangement, the anti-skid member may be pulled tightly in place and held securely in that position. It is to be noted that the anti-skid strap provides a load or pull on the clip 12 in such a manner as to tend to cant the clip on its flange 10 or 11 to thereby produce a binding action which prevents the clip from becoming dislodged upon the rim. In other words, it is not the pressure of the bead portions 5 and 6 against the clips 12 which provide the principal means for maintaining the anti-skid straps in position but this is secured primarily by the canting action which the pull of the strap exerts on the clips.

As hereinabove described, it is believed apparent that I have provided a novel arrangement for attaching an anti-skid strap or chain to the tire rim flange which is easily applied and which functions effectively.

Having thus described my invention, what I claim and desire to protect by Letters Patent is:

1. In combination with a pneumatic tire and a rim having spaced flanges formed with outwardly extending lips that lie alongside the tire walls, and anti-skid member for the tire, anchoring means for said member comprising an integral clip formed of sheet metal having a reversely bent part to conform to the cross-section curvature of a rim flange and to embrace the inner and outer faces of such flange and having a perforated wall positioned to be gripped between said flange and the tire bead with the tire wall bulging into such perforation, said clip also having an exposed protruding portion spaced from the flange lip, and means for attaching the anti-skid member to said protruding portion.

2. In combination with a pneumatic tire having non-extensible bead portions and a rim having side flanges each formed with an outwardly extending annular lip, an anti-skid member for the tire, anchoring means for said member comprising an integral clip formed of sheet metal having a length of more than one inch measured circumferentially of the rim and bent to conform to the cross-section curvature of a side flange and to embrace the inner and outer faces of such flange, said clip having an end portion that extends along the inner face of the side flange but not under the bead and a reversely curved intermediate portion that lies under and abuts against the outwardly extending lip and a second end portion comprising an extension projecting from this reversely curved portion, and means for attaching the anti-skid member to said extension near its end so that its pull upon the extension increases the grip of the clip upon the inner and outer faces of the side flange and holds the reversely curved portion against said lip.

ERNST EGER.

References Cited in the file of this patent

UNITED STATES PATENTS

| Number | Name | Date |
|---|---|---|
| 1,194,433 | Silberman | Aug. 15, 1916 |
| 1,958,934 | Williams | May 15, 1934 |
| 2,080,990 | Weekley | May 18, 1937 |
| 2,146,453 | Stahl | Feb. 7, 1939 |
| 2,241,592 | Goldenberg | May 13, 1941 |
| 2,308,904 | Wood | Jan. 19, 1943 |
| 2,344,970 | Copp | Mar. 28, 1944 |
| 2,461,267 | Givens | Feb. 8, 1949 |
| 2,545,061 | Weber | Mar. 13, 1951 |